Figure 1:
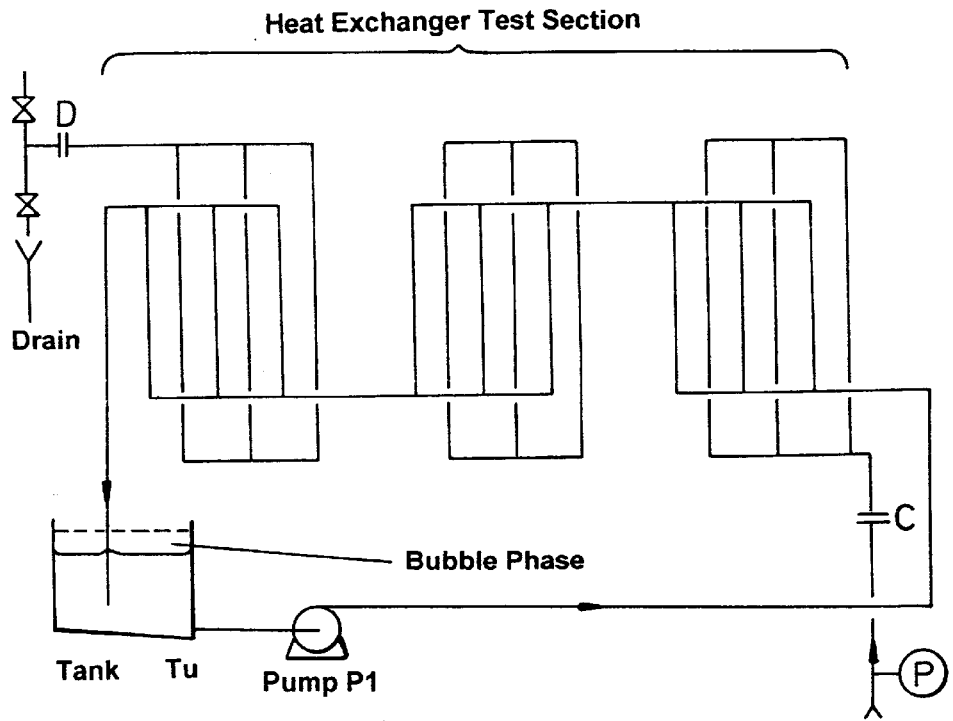

United States Patent
Shaw

[19]

[11] Patent Number: 6,035,700
[45] Date of Patent: Mar. 14, 2000

[54] METHOD OF LEAK TESTING AN ASSEMBLED PLATE TYPE HEAT EXCHANGER

[75] Inventor: Jonathan Graham Shaw, Goldboro, N.C.

[73] Assignee: APV Corporation, Goldsboro, N.C.

[21] Appl. No.: 08/948,925

[22] Filed: Oct. 10, 1997

[51] Int. Cl.[7] .................................................. G01M 3/10
[52] U.S. Cl. ................................................................ 73/40.7
[58] Field of Search ................................ 73/40.7, 40.5 R

[56] References Cited

U.S. PATENT DOCUMENTS

| | | | |
|---|---|---|---|
| 3,087,327 | 4/1963 | Kagi | 73/40.7 |
| 3,425,264 | 2/1969 | Frei | 73/40.7 |
| 4,103,536 | 8/1978 | Chipman | 73/40.7 |
| 4,138,856 | 2/1979 | Orlowski | 73/40.7 |
| 4,226,113 | 10/1980 | Pelletier et al. | 73/40.7 |
| 4,232,546 | 11/1980 | Dumont | 73/40.7 |
| 4,373,379 | 2/1983 | Obara et al. | 73/40.5 R |
| 5,070,723 | 12/1991 | Tsou et al. | 73/40.7 |

*Primary Examiner*—Michael Brock
*Attorney, Agent, or Firm*—Michael D. Rechtin; Foley & Lardner

[57] ABSTRACT

A method of positively indicating leaks in the heat transfer surface area of a heat exchanger between the normally separate fluid paths denoted by side (A) and side (B) arranged in a heat exchange relationship is disclosed. The method comprises:

placing a detector gas or gas mixture on one side;
    placing a carrier or entraining liquid in the other side;
    applying a positive pressure differential between detector gas and carrier fluid; and
    detecting entrained bubbles within the carrier fluid.

9 Claims, 1 Drawing Sheet

METHOD OF LEAK TESTING AN ASSEMBLED PLATE TYPE HEAT EXCHANGER

TECHNICAL FIELD OF THE INVENTION

The invention relates to the leak testing of an assembled plate type heat exchanger. The method used provides a clear indication of any cross leakage within the heat exchange area. This test is of a go or no go nature and does not serve to locate faulty components but rather serves to indicate that a cross leak exists somewhere in the exchanger.

PRIOR ART

The applicants sponsored a University research program in 1994 to investigate plate failure, due to fatigue, with resultant cross leakage across duo-safety type plates. In this program an electrolyte salt, Lithium chloride was used as the detection agent in solution leaking across the plate defect into a recipient liquid. This work culminated in a report by Mr. T. R. Kimber entitled "Fatigue testing of duo-safety heat exchanger plate" at Loughborough University of Technology. This report refers to prior art in its reference number 4, detailing a report from the Federal Institute for Research on Milk, Institute for Process Technology, Kiel, Germany, report number E, S 652" "The additional prototype tests on heat transfer plates for milk heaters types H17 duo-safety and type N35 duo-safety". This report dated August 1993 details cross leak detection by means of employing an electrolyte as the recipient liquid, in this case containing Sodium Hydroxide and forcing under pressure a phenol phthalein pH indicator across the leakage path. Therefore, use of two differing liquids where one is a donor and the other is a recipient and where one is an electrolyte is established prior art.

Other prior art includes pressurizing one side of the heat exchange surface. For example, monitoring the pressure with no external leakage will indicate a cross leak through the heat transfer surface by way of a pressure change.

SUMMARY OF THE INVENTION

According to our invention in a method of positively indicating leaks in the heat transfer surface area of a heat exchanger between the normally separate fluid paths denoted by side (A) and side (B) arranged in a heat exchange relationship, the method comprises:

placing a detector gas or gas mixture on one side;

placing a carrier or entraining liquid in the other side;

applying a positive pressure differential between detector gas and carrier fluid; and detecting entrained bubbles within the carrier fluid.

The gas or gas mixture may comprise a medium which will become vapor on passage through the leakage path.

The carrier or entraining liquid may comprise a liquid which is flowing through the section under test but may also be stationary.

SPECIFIC DESCRIPTION

The following description and accompanying drawings referred to therein are included by way of non-limiting example to illustrate how the invention may be utilized.

Figure 2:
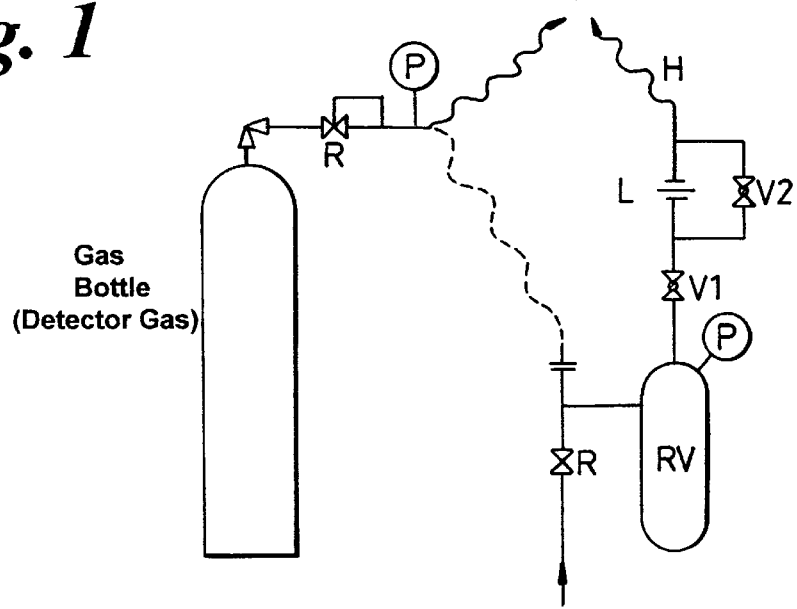

FIG. 1 is a diagrammatic representation of a dairy pasteurizer thermal section undergoing testing in accordance with the method of this invention; and FIG. 2 illustrates forced gas liquid draining equipment used to remove service side liquid without opening the test section to manually drain.

FIG. 1 shows a multipass heat exchange section within a pasteurizer to be leak tested along with a balance tank (TK) and pump (P1). The method outlined can be applied to any individual heat exchange section within a plate exchanger or to all thermal sections simultaneously if piped appropriately. The term "test section" can thus be interchanged with the term "complete plate heat exchanger" in the following description.

Reference is made to the two sides of the heat transfer surface which are normally designated as product (A) or service (B) and correspond to the two normally separated fluid flow paths. The designation of which path fluid path is A or B is totally arbitrary and therefore interchangeable.

Preferably, the test section is first thoroughly cleaned in place using the existing CIP procedures adopted by the end user to normally clean his equipment. It is then flushed with clean water to remove trace wash chemicals.

The next step of the test procedure depends on whether the service side (B) can be manually drained or not. Assuming that free drainage is not possible then forced drainage equipment shown in FIG. 2 is connected to one connection on the service side at point (C), the other being open to drain or to liquid recovery.

This equipment consists of a gas reservoir (RV), connection hose (H) or piping, isolation valve (V1) and flow limiting device (L) with bypass valve (V2).

The function of this equipment is to force, using gas pressure, all the liquid out of the service side (B) of the test section without needing to open the exchanger physically. The gas reservoir may be charged in situ with gas from a bottle via a regulator (R), or by preference, using any existing process air supply to some set pressure level. When discharged into the service side of the test unit, by opening (V1), the gas stored in the reservoir will cause the liquid contents on the service side of the test section to be rapidly expelled to drain or to recovery as so desired. This step may be repeated several times using different reservoir pressures and/or increasing rates of gas release until the service side liquid is substantially removed. Complete liquid removal is not required for full implementation of the leak detection procedure.

Once the service side of the section under test is adequately drained then a connection from the service side to a source of a high pressure indicator gas, gas indicator mixture or vapor is made via a pressure regulator at point (C). By way of example a suitable detector gas is carbon dioxide or any permissible halo carbon used in pure form or mixed with any other gaseous component or suitable vapor. The other service connection at (D) is closed with a manual vent ball valve fitted.

The next step is the procedure is to fill the product side (A) of the system with clean water or carrier fluid and circulate this liquid by means of a pump (P1) from a ballast tank (TK) through the test section and back to the tank forming a circuit. In the case of a pasteurizer the existing product side or CIP plant equipment may be effectively utilized for this purpose.

The fluid flow rate should preferably be such as to substantially expel trapped gases held within the product side of the "test section". The return connection into the ballast tank should be piped below the liquid level in the tank to promote easy visual detection of entrained returning gases. This piping will also reduce any liquid surface disturbances in the tank from creating bubbles.

If equipment permits, the circulating liquid is best heated above ambient temperature so as to expel dissolved gases from solution and to maintain a low gas solubility.

Fluid circulation is preferably continued until no further indication of entrained gases are detected at the ballast tank return.

The next step is to introduce a surfactant or any other foam stabilizing agent into fluid within the ballast tank and continue circulation. Observation is made of the number and relative size of any bubbles still present on the fluid surface within the ballast tank. This step is desirable but not essential.

The service side (B) indicator gas is now introduced into the service side at point (C) and purged if necessary through the vent ball valve to atmosphere in the case when the gas used for forcible draining is not also the test indicator gas or gas mixture. The indicator gas pressure is then raised to the leak detection pressure and immediate observation of the ballast tank surface begun.

At the leak detection pressure, indicator gas will be forced through any plate defects within the heat transfer area and into the circulating surfactant containing fluid, producing small bubbles. These bubbles will be entrained into the flowing liquid and carried through the test section and back to the ballast tank and accumulate to form a raft of small diameter bubbles floating on the ballast tank liquid level. The size distribution of these bubbles as well as the sudden step change in the observed rate of bubble formation on the liquid surface when gas pressure is applied is itself a positive indication of the presence of cross leakage somewhere in the heat transfer surface of the "test section".

Positive confirmation of cross leakage of the detector gas is made by sampling the foam and detecting the presence of the indicator gas by any suitable means including electronic, chemical or optical methods. A basic test procedure could be as follows.

A foam sample is placed in a container and a chemical added to collapse the foam, releasing the indicator gas or inert/indicator mixture which can then be directly detected. The detection method employed will depend on the choice for the detector gas, for example in the case of CO2 a simple air quality meter, measuring the CO2 content, can be used to detect a threshold shift in CO2 as the bubbles will contain a higher CO2 content than the ambient air.

I claim:

1. A method of positively indicating leaks in the heat transfer surface area of a heat exchanger between the normally separate fluid paths denoted by side (A) and side (B) arranged in a heat exchange relationship the method comprising:

placing a detector gas on one side;

placing a carrier fluid in the other side;

applying a positive pressure differential between the detector gas and the carrier fluid; and detecting entrained bubbles within the carrier fluid in which the bubbles are stabilized by adding a surfactant or foam stabilizing agent to the carrier fluid, a stable bubble mass serving to concentrate the detector gas by flotation for sampling, visual detection and eventual chemical verification, said foam stabilizing agent further enhancing detection by producing a mass transfer barrier in the bubble mass, inhibiting the detector gas from rapidly entering solution into the carrier fluid and so maintaining a high concentration of gaseous chemical species and the foam agent reducing small bubble agglomeration into larger bubble sizes which inhibits flow bubble entrainment and detection due to an increase in buoyancy to viscous drag bubble forces.

2. A method as claimed in claim 1, in which the gas comprises a medium which will become vapor on passage through a leakage path.

3. A method as claimed in claim 1, in which the carrier fluid comprises a fluid which is present in a heat exchanger section under test.

4. A method according to claim 1 further including an initial step of providing a plate type exchanger, said plate exchanger being of the fully gasketed, brazed, fully welded or welded plate pair construction.

5. A method according to claim 1 further including an initial step of providing a shell and tube exchanger.

6. A method according to claim 1 in which leak detection sensitivity is increased through use of a non steady state positive differential pressure.

7. A method according to claim 1 in which leak detection is performed by at least one of the steps of visual observation of the formation of a separate bubble phase and by employing an optical instrument.

8. A method according to claim 1 in which confirmation of the presence of gas cross leakage is made by detecting the presence of some chemical species within the entrained bubbles.

9. A method according to claim 1 in which the foam is directly sampled from a product side connection of a test section without needing to establish a flow circuit for the carrier fluid.

* * * * *